United States Patent [19]

Ewen

[11] 4,095,056

[45] June 13, 1978

[54] TOLL RESTRICTOR ACCESS CIRCUIT

[75] Inventor: Joel J. Ewen, Lithia, Va.

[73] Assignee: Tele-Path Industries, Inc., Roanoke, Va.

[21] Appl. No.: 774,089

[22] Filed: Feb. 28, 1977

Related U.S. Application Data

[63] Continuation-in-part of Ser. No. 506,602, Sep. 16, 1974, abandoned.

[51] Int. Cl.$^2$ ............................................. H04M 1/66
[52] U.S. Cl. ................................................ 179/18 DA
[58] Field of Search ................................... 179/18 DA

[56] References Cited

U.S. PATENT DOCUMENTS

| | | | |
|---|---|---|---|
| 3,331,926 | 7/1967 | Largey | 179/18 DA |
| 3,784,757 | 1/1974 | Woolf et al. | 179/18 DA |
| 3,872,260 | 3/1975 | Oatis | 179/18 DA |
| 3,902,024 | 8/1975 | Hijikata et al. | 179/18 DA X |

Primary Examiner—William C. Cooper
Attorney, Agent, or Firm—Sughrue, Rothwell, Mion, Zinn and Macpeak

[57] ABSTRACT

A toll restrictor access circuit for use with a plurality of toll restrictors shared by a group of telephone lines is disclosed. The access circuit connects a toll restrictor to a telephone line when a call is initiated so that the number dialed by the caller can be monitored to determine whether the number being dialed is one that is authorized. The toll restrictor controls a polarity reversal relay in the access circuit to disable the telephone dial until a dial tone is detected. If the caller dials a valid number, the toll restrictor energizes a permit relay in the access circuit which allows the call to be completed in the normal manner. The permit relay also de-energizes the polarity reversal relay thereby disabling the telephone dial and releases the toll restrictor so that it may be used by another telephone line. If on the other hand the caller dials a prohibited number, the toll restrictor energizes a restrict relay which disconnects the telephone instrument from the telephone line. At this point, either a busy signal or a recorded announcement can be connected to the telephone instrument. Energization of the restrict relay also de-energizes the polarity reversal relay and releases the toll restrictor. Connection of the toll restrictor to the telephone line also results in energization of a supervisory relay which, together with a time delay circuit, is effective to defeat unauthorized calls by means of flashing the telephone instrument hook switch. The access circuit permits the use of two or more toll restrictors to be shared by a group of telephone lines and may be used either with key system or switchboard system installations. In either type of installation, restricted and non-restricted telephones are classified upon installation. The access circuit includes circuitry to recognize the classification of the telephone instruments.

12 Claims, 3 Drawing Figures

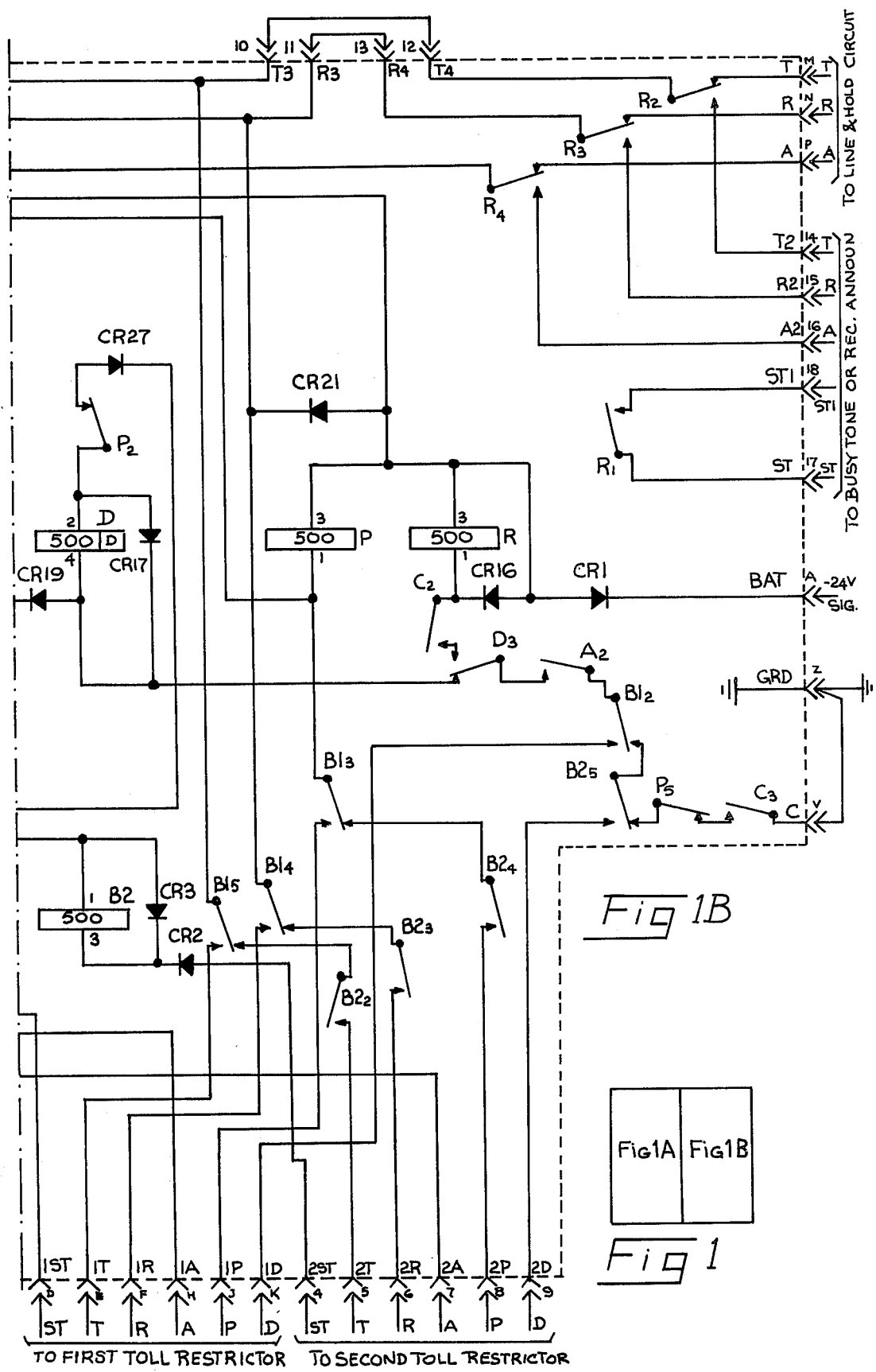

TOLL RESTRICTOR ACCESS CIRCUIT

CROSS REFERENCE TO RELATED APPLICATION

This application is a continuation-in-part application of application Ser. No. 506,602 filed Sept. 16, 1974, now abandoned.

BACKGROUND OF THE INVENTION

The present invention relates to telephone systems and in particular to the apparatus located on the subscriber's premises, be it a simple telephone instrument, a set of multibutton telephone instruments known as a "key system", or a manual or automatic telephone switchboard. Where the owner of the premises desires to prevent long distance calls involving "toll" charges from being initiated from certain of the telephone extensions on his premises, devices known as toll restrictors are used. The present invention specifically relates to an access circuit for use with toll restrictors.

In conventional telephone systems prior to the invention disclosed herein, the availability of toll restriction was mainly limited to users of large switchboards. In one technique, the register in the telephone exchange which receives the number being dialed momentarily reverses the polarity of the telephone line. This signal is detected at the switchboard which then disconnects the caller.

Individual toll restrictors have also been available which could be connected across the telephone line, normally on the subscriber's premises, and would monitor the dial pulses emitted by a rotary dial telephone, and if a "1" or a "0" were dialed, it would interrupt the line. Programmable toll restrictors have also been available which permit calls to certain three-digit prefixes and not to others.

However, prior to the invention disclosed herein, there was no toll restriction arrangement suitable for use with multi-frequency tone-dial telephone instruments, and the toll restriction arrangements which have been available are easily fooled. Among the methods used to fool prior telephone restriction arrangements are the following:

a. Dialing one or two valid digits before the central office is ready. If a valid digit is dialed before the dial tone has been received, it is ignored by the telephone exchange. The toll restrictor has, however, received and recognized the valid digit and assumes a legitimate call is being made. When the telephone exchange is ready and transmits a dial tone, the caller then proceeds to dial a toll number.

b. Placing a local call and then not hanging up. In many cities, if one party does not hang up after the completion of a call which he has either placed or received, he will receive a new dial tone. Since the toll restrictor has already recognized the call as a valid one, the subscriber can proceed to dial a toll call.

SUMMARY OF THE INVENTION

The present invention provides the means to connect a toll restrictor to a telephone line so that the number dialed by the caller can be monitored to determine whether the number being dialed is one that is authorized. It also permits two or more toll restrictors to be shared by a group of telephone lines, thereby reducing the cost for a toll restriction arrangement. It also contains safeguards to prevent the toll restrictor from being fooled in the manner described above, plus it contains safeguards against new ways of fooling toll restrictors monitoring multi-frequency tone-dial telephones. The circuit, according to the invention, results in an economic benefit and provides a much safer operation as compared to existing toll restriction arrangements without any sacrifices as to reliability and performance.

Briefly, in accordance with the preferred disclosed embodiment of the invention, the toll restrictor access circuit includes seven relays plus some diodes and miscellaneous components. When a telephone user initiates a call from a telephone instrument, whether it be a part of a key system or a switchboard system, a start relay is energized. This initiates the operation of the toll access circuit. Two access relays are provided corresponding to the two toll restrictors which are available for use by the circuit according to the preferred embodiment. If the toll restrictors are free, they provide signals to the access relays which, in conjunction with a contact closure from the start relay, energizes the access relays. If only one toll restrictor is free, only one access relay is energized. If both toll restrictors are free, both relays attempt to energize, but which ever access relay is faster disconnects by means of its contacts the other access relay. The access relay then connects the toll restrictor to the telephone line as well as to a permit and a restrict relay in the access circuit. The access relay by means of other contacts inhibits the operation of the corresponding access relay in other access circuits so that no other access circuit can use this toll restrictor while it is connected to the telephone line.

A ground provided on the restrict wire to the restrict relay from the toll restrictor energizes a supervisory relay but inhibits the operation of a polarity-reversal relay. The polarity of the telephone line to the calling instrument remains with the polarity reversed, thereby disabling the telephone dial. When the central office is ready, a dial tone is sent which is detected by the toll restrictor. The ground on the restrict wire is removed causing the polarity-reversal relay to energize and reverse the polarity of the telephone line. At this point, the caller may now dial the desired telephone number. The toll restrictor monitors the numbers being dialed. If the caller dials a valid number, the toll restrictor transmits a ground on the permit wire to the permit relay, energizing the permit relay in the access circuit. By means of its contacts, the permit relay de-energizes the polarity-reversal relay, preventing further dialing, and also releases the access relay, freeing the toll restrictor for use by another telephone line. It is contemplated that the toll restrictors used with the access circuit according to the invention may include a built-in timer which allows the caller a predetermined period of time in which to complete the dialing operation. If the caller fails to dial within the predetermined time period, the permit relay is energized by a ground transmitted on the permit wire by the toll restrictor. This does not, however, result in the completion of a telephone call because the polarity-reversal relay is de-energized thereby preventing further dialing. The permit relay remains energized in conjunction with the start relay until the caller replaces the handset of his telephone, thereby preventing him from dialing any further numbers of initiating a new call without first hanging up.

If instead of dialing a valid number as just described, the caller dials a prohibited number, the toll restrictor transmits a ground on the restrict wire to the restrict relay. This results in energization of the restrict relay which disconnects the calling telephone from the telephone line. The restrict relay, in addition to disconnecting the calling telephone from the telephone line, may connect a busy tone, an operator or a recorded announcement, if available, to the calling telephone. Like the permit relay, energization of the restrict relay de-energizes the polarity-reversal relay, preventing further dialling, and also releases the access relay, freeing the toll restrictor to handle another call. The caller remains disconnected until he hangs up, at which time the start and restrict relays release.

If, when equipped with a multi-frequency tone-dial telephone, the caller manipulates his telephone hook switch to simulate the pulses emitted by a rotary dial, the start relay first releases de-energizing the access relays and then re-operates. The supervisory relay which is connected to an RC time delay circuit does not release, however. As a result, the access relays are not re-energized, and a circuit path via the operated contacts of the start and supervisory relays and the released access relays energizes the restrict relay, thereby disconnecting the caller.

The classification of restricted and non-restricted telephones is made upon installation at the customer's premises. In a key system, non-restricted telephones are connected directly to the telephone line, but restricted telephones are connected to the telephone line by means of the toll restrictor access circuit. The access circuit according to the invention permits the use of privacy units with the telephone instruments in a key system installation. In switchboard systems, both restricted and non-restricted telephones are connected to the telephone line by means of the toll restrictor access circuit; however, the switchboard identifies a restricted telephone by means of a transmitted pulse. The toll restrictor access circuit includes the circuitry to recognize the classification of the restricted and non-restricted telephones.

BRIEF DESCRIPTION OF THE DRAWINGS

The invention is described in further detail below with reference to the drawings, wherein:

FIG. 1 is an illustration of the manner in which the following FIGS. 1A and 1B are joined; and FIGS. 1A and 1B, when joined, form a complete circuit diagram of the preferred embodiment of the invention.

DESCRIPTION OF THE PREFERRED EMBODIMENT

Figure 1A:
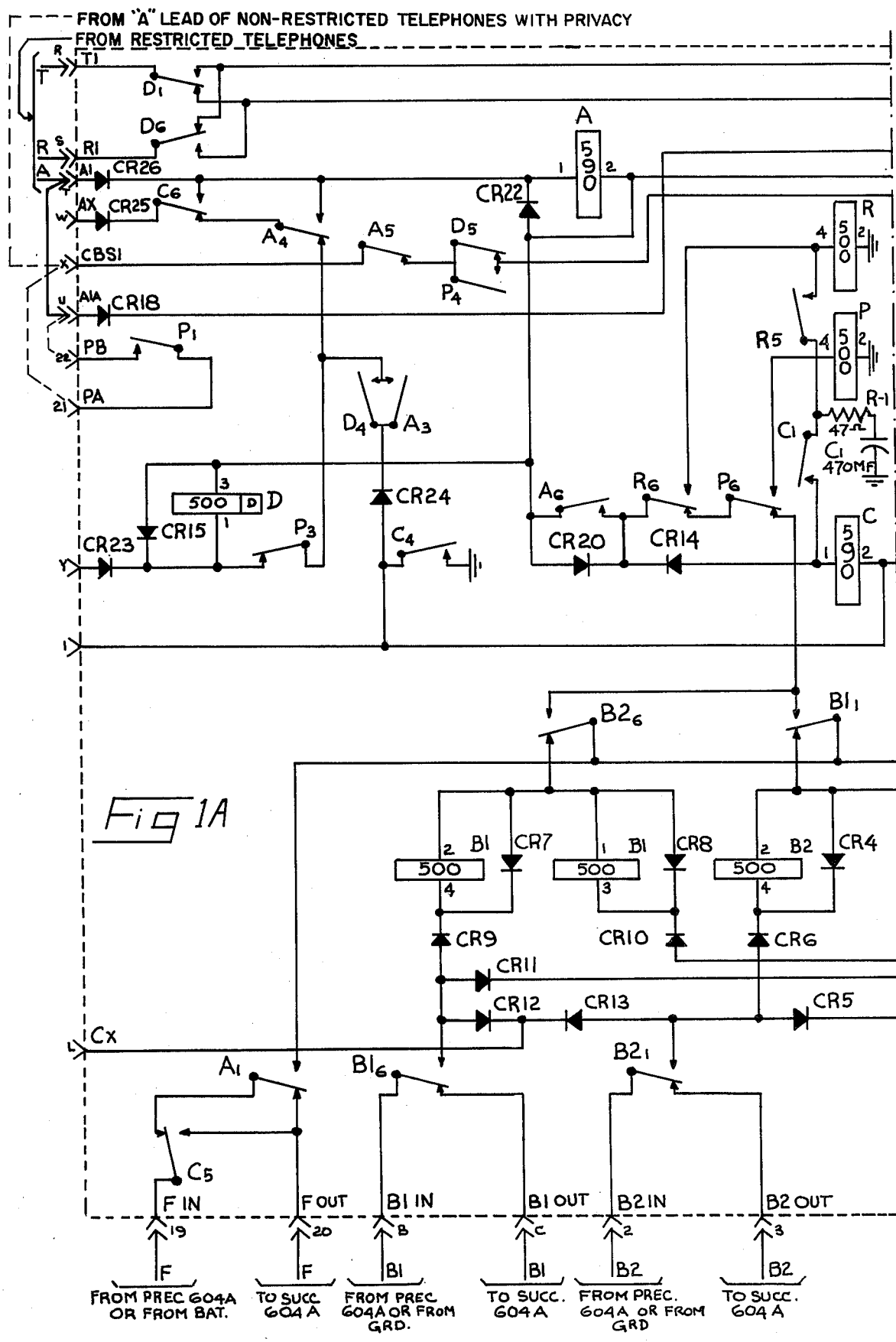

Referring to FIGS. 1A and 1B together, the toll restrictor access circuit is shown as comprising a start relay A, two access relays B1 and B2, supervisory relay C, polarity-reversal relay D, a permit relay P, a restrict relay R, a timing circuit consisting of a resistor R1 and a capacitor C1, and a number of diodes. The two-wire line and the control wire to the restricted telephone instruments are connected to terminals T1, R1 and A1, respectively, shown in the upper left hand corner of FIG. 1A. The two-wire line and control wire to the key system control equipment are connected to the terminals T, R and A shown in the upper right-hand corner of FIG. 1B. In the case of a switchboard, terminals T and R are only connected to the telephone exchange. In a key system, non-restricted telephone instruments are connected in parallel with terminals T, R and A in the upper right-hand corner of FIG. 1B. In a switchboard system, on the other hand, non-restricted telephones are connected by the switchboard to the access circuit in the same manner as restricted telephones. At the bottom of FIG. 1B, the six wires to the first toll restrictor are shown as 1ST, 1T, 1R, 1A, 1P and 1D, while the six wires to the second toll restrictor are shown as 2ST, 2T, 2R, 2A, 2P and 2D, respectively. It is preferred to use toll restrictors of the type manufactured by Tele-Path Industries, Inc., Roanoke, Virginia, Model TPI 603C; however, other toll restrictors providing substantially the same function can be used with the toll restrictor access according to this invention. At the right-hand side of FIG. 1B, the two wires to the direct current power supply are shown as BAT (negative) and GRD (positive). If the complete toll restriction arrangement involves other telephone lines, then other access circuits are provided, one access circuit for each telephone line. The wires to the preceding access circuit, if any, are shown as F IN, B1 IN and B2 IN, while the wires to a succeeding access circuit, if any, are shown as F OUT, B1 OUT and B2 OUT at the bottom of FIG. 1A. Contacts operated by a relay are designated with the same letter as the relay followed by a numeral. Thus, contacts A1 through A6 are the contacts of the start relay A. Contacts are not necessarily shown in proximity to the coil of their respective relay. All relay contacts are illustrated in the condition they are in when the relay coil is de-energized.

When a call is initiated to the telephone exchange from a telephone instrument which has been designated as "toll restricted", the operation of the telephone hook switch or the action of a manual or automatic switchboard connects the telephone across the T1 and R1 terminals. This action alerts the telephone exchange via the T and R terminals to expect an outgoing call, in the standard manner. At the same time, the telephone instrument or switchboard connects ground (positive voltage) to the A1 terminal, energizing the start relay A. Contacts A1 of the start relay A connect the F IN terminal to the coils of the access relays B1 and B2. If this is the first access circuit in the chain, or if there are no preceding access circuits requesting a toll restrictor, battery (negative voltage) will be applied to the access relay coils via contacts C5, A1 and B2 6 and B1 1, respectively. If the first toll restrictor is free and available for service, it will apply a ground to the 1ST terminal. Similarly, if the second toll restrictor is free, it will apply a ground to the 2ST terminal. Thus, if both toll restrictors are free, ground will appear on both of terminals 1ST and 2ST. Assuming both toll restrictors are free, ground is connected to terminal 3 and battery to terminal 1 of the coils of relays B1 and B2. Both relays attempt to energize at the same time. Assuming relay B1 is faster, contacts B1 1 disconnect the battery from the coil of relay B2 so that only relay B1 energizes. Conversely, if relay B2 is faster, contacts B2 6 disconnect battery from the coil of relay B1, preventing it from energizing. Thus, if only one toll restrictor is free only one access relay is energized, and if both toll restrictors are free, still only one access relay is energized. If neither of the toll restrictors are free, the toll restrictor access circuit waits until one becomes available, at which time the corresponding access relay is energized. In the meantime, the A1 contact disconnects the F OUT terminal, thereby preventing any other of the succeeding access circuits from seizing a toll restrictor by depriving their access relays of battery.

Since the operation of the access circuit is identical regardless of whether the B1 or the B2 relay is energized, for purposes of the following description it will be assumed that the B1 relay is energized. Contacts B1 6 connect the B1 IN terminal to a second coil of the B1 relay and disconnect the B1 OUT terminal. If the B1 relays of any preceding access circuits are not energized, or if there are no preceding access circuits, ground will be present on the B1 IN terminal maintaining relay B1 energized via its second coil. In disconnecting ground from the B1 OUT terminal, this access circuit prevents the B1 relay of any succeeding access circuits from being energized. Thus if, for example, five identical access circuits are provided for five telephone lines, the B1 relay of only access circuit can be energized at any one time. Contacts B1 1 disconnect the coils of the B2 relay to prevent that relay from being energized, and the same contacts connect the coils of relay B1 to another source of battery via contacts P6, R6 and A6. Contacts B1 5 and B1 4 connect the T and R wires of the telephone line to the 1T and 1R wires of the first toll restrictor, so that the latter can monitor the telephone lines to determine if a dial tone is present and also what number is being dialed. Contacts B1 3 and B1 2 connect the 1P and 1D terminals from the toll restrictor to the permit relay P and the supervisory relay C, respectively. Since there is no potential present on the 1P terminal at this point in time, the permit relay P remains unenergized.

Since there is ground present on the 1D wire from the first toll restrictor, the supervisory relay C is energized via contacts B1 2, A2, D3, diode CR19, the coil of relay C, diode CR14, contacts A6, diode CR1 and battery. Contacts C1 connect resistor R1 and capacitor C1 to the coil of relay C providing it with a time delay should the circuit be de-energized. Contacts C4 connect another ground to the coil of relay C to provide relay C with a holding path for such time as the toll restrictor removes the ground from the 1D terminal. Contacts C5 reconnect the F IN terminal to the F OUT terminal so that succeeding access circuits, if any, which were temporarily deprived of battery for their access relays can now seek a toll restrictor. Since in the example being described this access circuit is using the first toll restrictor, another access circuit could seize the second toll restrictor, and any further access circuits requiring a toll restrictor would have to wait.

The toll restrictor is monitoring the telephone line, and as soon as the telephone exchange is ready, it transmits a dial tone to the calling telephone via the T and R wires. The toll restrictor detects the dial tone and causes ground to be removed from the 1D terminal. The ground which energized the C relay was also applied to both coils of the polarity-reversal relay D. However, since the coils are connected in opposition so that the flux is cancelled, the D relay does not operate. When the toll restrictor removes ground from the 1D terminal, ground is removed from terminal 4 of the D relay; however, terminal 1 of the D relay continues to receive ground via contacts C4, A3, and P3. Diode CR19 prevents this ground from reaching terminal 4 of relay D. With only one coil energized, relay D can now operate. Contacts D3 disconnect the original operating path of relay C and connect the 1D terminal from the toll restrictor to the restrict relay R so that any future signals received from the toll restrictor via that terminal will operate the restrict relay.

Contacts D1 and D6 reverse the polarity of the telephone line to the instrument, thereby enabling the caller to dial the number he desires. Up to this point, the caller was prevented from using the dial of his telephone instrument by the reversed polarity on the telephone line. More specifically, the dials of multi-frequency tone-dial telephone instruments manufactured by Western Electric, ITT, Stromberg-Carlson and others are disabled if the polarity of the telephone line is reversed. On the other hand, the dials of the multi-frequency tone-dial telephone instruments manufactured by GTE Automatic Electric contain a polarity guard, or full wave rectifier, for rendering the dial insensitive to reversals of line polarity. To use the latter instruments with the toll restrictor access circuit according to present invention, the polarity guard must be disabled to make the dials polarity sensitive. A rotary dial telephone may be made polarity sensitive by connecting a diode across the pulsing contact of the dial of the telephone instrument. Until the polarity reversal relay D has been energized, the telephone dial has been disabled to prevent the caller from transmitting misleading digits to the toll restrictor before the telephone exchange is ready.

The caller now commences to dial the desired number. The information is transmitted to the telephone exchange via the T and R wires in the standard manner, and the information is also transmitted to the first toll restrictor via the 1T and 1R terminals. The toll restrictor analyzes the number being transmitted. Upon determining that a valid and authorized telephone number has been dialed, the toll restrictor transmits a ground to the 1P terminal. In the event that the caller fails to dial within a prescribed period of time as determined by a timer built into the toll restrictor, the toll restrictor likewise transmits a ground to the 1P terminal. Either way, the permit relay P is energized. The contacts P6 of the permit relay P de-energize the access relay B1 and provides the P relay with a holding circuit via a second coil. Contacts P2 and P3 disconnect the polarity-reversal relay D. When access relay B1 releases, contacts B1 2, B1 3, B1 4, and B1 5 disconnect the first toll restrictor from this access circuit. The first toll restrictor is now free for use by another access circuit, when required. Contacts D1 and D6 of the polarity-reversal relay again reverse the polarity of the telephone line thereby preventing further dialling. Should the telephone exchange return another dial tone, the caller is prevented from dialling and must hang up.

If the desired party answers, the caller may converse with him in the standard manner. Speech signals are carried between the two instruments via the T and R wires. The circuit remains in this condition until the caller replaces his handset. At that time, ground is removed from the A1 terminal, releasing the start relay A. Contacts A6 disconnect the permit relay P and the supervisory relay C, and these relays also release. Since all relays are released, the circuit is back to its original state and ready for a new call.

If instead of dialing a valid number as just described, the caller dialed an unauthorized or long distance number, the toll restrictor would have detected it. Instead of transmitting a ground to the 1P terminal, the toll restrictor would have transmitted a ground to the 1D terminal. This ground would energize the restrict relay R via contacts B1 2, A2, D3 and C2. Contacts R6 of the restrict relay R disconnect the access relay B1 and provide a holding circuit for the relay R via a second coil. When the B1 relay releases, it disconnects the first toll restrictor and frees it for another access circuit as just described. Contacts R2 and R3 disconnect the caller from the telephone exchange by opening the telephone line. These same contacts may connect the caller to a source of busy tone, to an intercept operator or to a recorded announcement, if available, which would be connected to terminals T2 and R2 shown at the right-hand portion of FIG. 1B. Contacts R1 start the tone or announcement machine. Contacts R4 disconnect the A lead to the key equipment line circuit to release the line circuit and free it for use by a non-restricted key system instrument. It also connects the A-lead ground to terminal A2 for operation of special equipment, if required. The caller, realizing that he has been disconnected, replaces the handset of his telephone. Start relay A is de-energized and contacts A6 de-energize restrict relay R and supervisory relay C. The release of these relays is delayed by the timing circuit consisting of the resistor R1 and capacitor C1 to insure that if the caller lifts his handset again before the exchange has released his connection, he will still be disconnected by the R relay.

If the dialer with a multi-frequency tone-dial telephone attempts to fool the toll restrictor by flashing his hook switch to simulate the pulses generated by a rotary telephone dial, the start relay A follows the operation of the hook switch and releases and re-operates. Upon releasing, contacts A6 release the access relay B1 or the permit relay P, which ever was operated at the time. Upon re-operating, contacts A2 of the start relay A complete a circuit to energize the restrict relay R via normally open contacts C3 of the supervisory relay C which has remained operated because of the time delay circuit, normally closed contacts P5, B2 5 and B1 2, one of which just closed to enable this circuit, and contacts A2, D3 and C2. The restrict relay R then proceeds to disconnect the caller as previously described.

If instead of an outgoing call to the telephone exchange, as was just described in great detail, the call is incoming to the telephone instrument, the operation is as follows: The telephone exchange transmits a ringing signal to the telephone instrument via the telephone line in the standard manner. When the caller lifts his handset to answer, the start relay A, one of the access relays B1 or B2 and the supervisory relay C operate, the same as for an outgoing call. Since the call is incoming, the toll restrictor never detects a dial tone, and after a predetermined period of time as determined by the built in timer of the toll restrictor transmits a ground to the 1P terminal. The permit relay P is energized as was described and the same subsequent operation occurs. The toll restrictor is released, and the caller is prevented from using his dial in the event that the telephone exchange later transmits a dial tone. Again, all relays release when the caller hangs up.

Description of the access circuit has been made for the case of restricted telephones. As previously mentioned, non-restricted telephones in a key system are connected in parallel across the output terminals T, R and A in the upper right-hand corner of FIG. 1B. Continuity for the control line A from terminal A in the upper left-hand corner of FIG. 1B to terminal A in the upper right-hand corner of FIG. 1B is provided by the jumper wire between terminals A1 and A1A and the diode CR18 in the upper left-hand corner of FIG. 1A and relay contacts R4 in the upper right-hand corner of FIG. 1B. In a key system, the diode CR18 prevents a ground signal from appearing on terminal 1 of the coil of the start relay A when the handset of a non-restricted telephone is removed from the hook. In this manner, restricted and non-restricted telephones are distinguished by the access circuit in a key system. Recently, telephone instruments containing privacy units have been introduced for use with key telephone systems. The privacy unit disconnects the handset of its associated telephone if that telephone attempts to access a line already in use. Since the privacy unit monitors the A lead to determine if a line is in use, diode CR18 would defeat the privacy unit in restricted telephones when a non-restricted telephone is off-hook. Therefore, in a key system utilizing telephone sets equipped with privacy units, a different connecting arrangement is used. Terminal PB is connected to terminal A1A and terminal PA is connected to terminal CBS1. Also, the "A" lead of the non-restricted telephone is connected to CBS1 instead of A. With this arrangement, the operation does not differ on a call by a restricted station. However, when a non-restricted station goes off-hook, the ground on his A lead energizes the P relay via CBS1 and contacts A5 and D5. Contacts P1 connect the A leads of the restricted and non-restricted stations together and also operate the start relay A. However, the access circuit is already in the permit mode and no other operation takes place. The joining of the two "A" leads allows the ground from the non-restricted station's A lead to reach the restricted station's privacy unit. The non-restricted station is thus assured his call remains confidential.

In contrast to the key telephone systems, both restricted and non-restricted telephones are connected to the exchange via the toll restrictor access circuit in switchboard systems. In the case of a non-restricted telephone, ground appears at the terminal AX and energizes the polarity-reversal relay D via diode CR25 and contacts C6, A4 and P3. The polarity-reversal relay D then reverses the polarity of the telephone line allowing the caller to dial out in the normal manner. On the other hand, when the handset of a restricted telephone is lifted from the hook switch, ground in the form of a momentary pulse is applied also to the terminal A1 by the switchboard. In this case, the start relay A is energized and latches via its A4 contacts which connect a continuous ground from the terminal AX via diode CR25 and contacts C6 and A4 to terminal 1 of the start relay A. If the switchboard trunk circuit contains a repeat coil (isolation transformer) which would prevent the polarity reversal from being detected by the telephone instrument, jumpers T3-T4 and R3-R4 are removed. The circuitry to the left of T3/R3 is inserted between the repeat coil and the station, while the circuitry to the right remains between the switchboard and the exchange.

Diodes CR3, CR4, CR7, CR8, CR15, CR16, CR17, CR20, CR21 and CR22 provide spark suppression for the relay coils with which they are associated so as to protect the life of the contacts in the respective energizing circuits. Diode CR1 protects the circuit in the event that the installer reverses the polarity of the power supply. The remaining diodes prevent ground signals from entering circuits where they are not desired.

While the invention has been described in terms of a preferred embodiment, those skilled in the art will recognize that the invention may be practiced by making modifications to the specific circuitry which has been disclosed. For example, while the preferred embodiment contemplates the use of two toll restrictors to be shared by a number of telephone lines, for reasons of economy, only one toll restrictor might be used with the access circuit. In such a case, access relay B2 and its associated circuitry could be eliminated. On the other hand, more than two toll restrictors could be provided, in which case, additional access relays would be provided. Moreover, while the preferred embodiment has been described in terms of relay circuits, the same switching function can be provided by solid state switches as is well known in the art. The use of solid state switching circuits would, of course, permit implementation of the access circuit according to the invention by integrated circuit techniques.

I claim:

1. A toll restrictor access circuit for use with at least one toll restrictor which may be shared by a group of telephone lines comprising:
   access means connected to said toll restrictor and enabled by the initiation of a telephone call from a restricted telephone instrument on one of said telephone lines for connecting said toll restrictor to the telephone line, said toll restrictor thereafter monitoring said telephone line to detect a dial tone,
   polarity-reversal means connected to the telephone line of the restricted telephone for normally disabling the telephone dial but responsive to said toll restrictor after the detection of a dial tone for reversing the polarity of the telephone line and enabling the telephone dial, and
   restrict means controlled by said toll restrictor for disconnecting the restricted telephone from the telephone line in the event that a prohibited number is dialed and detected, said restrict means also causing said polarity reversal means to resume its normal condition to prevent further operation of the telephone dial and releasing said toll restrictor for use by another telephone line.

2. A toll restrictor access circuit for use with at least one toll restrictor which may be shared by a group of telephone lines comprising:
   access means connected to said toll restrictor and enabled by the initiation of a call from a restricted telephone for connecting said toll restrictor to the telephone line of the restricted telephone, and
   permit means controlled by said toll restrictor for permitting the completion of a call to a valid number and releasing said toll restrictor for use by another telephone line.

3. A toll restrictor access circuit as recited in claim 2 for use with a plurality of toll restrictors, said access means being connected to each of said plurality of toll restrictors and responsive to the initiation of a call from a restricted telephone for connecting only a single one of said plurality of toll restrictors to the telephone line.

4. A toll restrictor access circuit as recited in claim 3 wherein said access means includes interlock means connected to each of said plurality of toll restrictors to prevent the connection of more than one toll restrictor to the telephone line in the event that more than one toll restrictor is free at the time a call from a restricted telephone is initiated.

5. A toll restrictor access circuit for use with at least one toll restrictor which may be shared by a group of telephone lines comprising:
   access means connected to said toll restrictor and enabled by the initiation of a call from a restricted telephone to connect said toll restrictor to the telephone line of the restricted telephone,
   supervisory means energized by said toll restrictor upon the connection of said toll restrictor to the telephone line, and
   restrict means controlled by said toll restrictor for disconnecting the restricted telephone from the telephone line in the event a prohibited number is dialed and detected, said supervisory means including time delay means to enable said restrict means in the event that said access means is falsely signaled by manipulating the hook switch of the restricted telephone.

6. A toll restrictor access circuit for use with at least one toll restrictor which may be shared by a group of telephone lines comprising:
   access means connected to said toll restrictor and enabled by the initiation of a call from a restricted telephone to connect said toll restrictor to the telephone line of the restricted telephone,
   polarity-reversal means connected to the telephone line of the restricted telephone for normally disabling the telephone dial but responsive to said toll restrictor after the detection of the dial tone for reversing the polarity of the telephone line and enabling the telephone dial, and
   permit means controlled by said toll restrictor for causing said polarity reversal means to resume its normal condition to prevent further operation of the telephone dial if either a valid number is dialed and detected or a predetermined period of time has elapsed and releasing said toll restrictor for use by another telephone line and, if a valid number was detected, permitting the completion of the call.

7. A toll restrictor access circuit as recited in claim 6 further comprising restrict means also controlled by said toll restrictor for disconnecting the restricted telephone from the telephone line in the event a prohibited number is dialed and detected, said restrict means also causing said polarity reversal means to resume its normal condition to prevent further operation of the telephone dial and releasing said toll restrictor for use by another telephone line.

8. A toll restrictor access circuit as recited in claim 7 further comprising supervisory means energized by said toll restrictor upon the connection of said toll restrictor to the telephone line, said supervisory means including time delay means for enabling said restrict means to maintain the telephone disconnected from the telephone line in the event that the caller hangs up and again lifts his handset before the telephone exchange releases its connection.

9. A toll restrictor access circuit as recited in claim 7 for use with a plurality of toll restrictors wherein said access means includes interlock means for connecting only a single one of said plurality of toll restrictors to the telephone line.

10. A toll restrictor access circuit as recited in claim 7 wherein both restricted and non-restricted telephones are connected to said telephone lines via the toll restrictor access circuit, said toll restrictor access circuit further including means for recognizing the classification of telephones as either restricted or non-restricted and permitting non-restricted telephones unlimited access to the telephone line.

11. A toll restrictor access circuit as recited in claim 7 wherein a non-restricted telephone is directly connected to the telephone line and said toll restrictor access circuit includes means for preventing the energization of said access means by the initiation of a call from a non-restricted telephone.

12. A toll restrictor access circuit as recited in claim 11 wherein a restricted telephone associated with said non-restricted telephone contains a privacy unit for disconnecting the restricted telephone when an attempt is made to access a designated line already in use by said non-restricted access circuit includes means for providing a common connection between the non-restricted and the associated restricted telephones to permit the privacy unit to monitor said designated line to determine when it is in use.

* * * * *